Patented Apr. 10, 1934

1,954,468

UNITED STATES PATENT OFFICE 1,954,468

PROCESS OF PRODUCING AMINO-
DIPHENYLS

Charles F. Booth, Anniston, Ala., assignor to
Swann Research, Inc., a corporation of Alabama No Drawing. Application September 27, 1929,
Serial No. 395,758

9 Claims. (Cl. 260—130.5)

This invention relates to a method for the preparation of aminodiphenyl from nitrodiphenyl, and particularly to a method in which the reduction is effected by means of iron and an acid.

Previously known methods for the reduction of the nitrodiphenyls have comprised the use of tin or stannous chloride and hydrochloric acid, as reducing agents, the reaction taking place in ether or alcohol. In some cases of reduction the product formed has been contaminated with a chlorine substituted amine, chlorination taking place due to the conditions of the experiment and consequently considerably lowering the yield of aminodiphenyl.

This invention has as an object the preparation of aminodiphenyl by a novel means by which higher yields of aminodiphenyl are obtained. A further object of this invention is the preparation of aminodiphenyl by a cheap, reliable method which gives a good yield of pure aminodiphenyl, uncontaminated by halogen substituted products.

These objects are accomplished by the following invention. I have found that by activating the iron filings with acid, then mixing them with benzene followed by nitrodiphenyl, or mixing directly with benzene containing nitrodiphenyl, then adding a small amount of water, the reduction to aminodiphenyl proceeds in a smooth manner with good yields. The control of this reaction is particularly easy by merely adding an additional amount of water as it is used up by the reaction.

The preparation of 2-aminodiphenyl by the reduction of 2-nitrodiphenyl by my process is illustrated by the following example:

Dissolve two hundred and fifty grams of 2-nitrodiphenyl in 125 cc. of commercial grade benzene. In another vessel, pour 87.5 cc. of concentrated hydrochloric acid, over 500 grams of 20–28 mesh cast iron filings. Mix thoroughly, then dry the product in a stream of cold air. Now add the treated iron filings obtained above to the benzene solution of 2-nitrodiphenyl contained in a vessel provided with reflux condenser and capable of being heated. The mass is now heated until a reaction starts, after which heating is discontinued. Now add a few cubic centimeters of water and stir.

A vigorous reaction will take place, which diminishes as the water is used up. When the reaction is almost stopped, add another small amount of water. Continue the addition of water over a period of three hours, adding a total of 65 cc. of water in small portions. If benzene is lost through the reflux, replace from time to time. After the reaction has ceased, heat for one hour on a water bath. Filter the mass, and wash the iron residue with benzene. Now add 500 cc. 3–N hydrochloric acid to the cold benzene solution, which treatment precipitates the 2-aminodiphenyl hydrochloride. The precipitate is now filtered off, washed with benzene and cold water, and dried at 80° C. If desired, the benzene layer may be separated from the wash water and distilled to recover the unreduced nitrodiphenyl. A yield of 90% of the theoretical quantity of the 2-aminodiphenyl hydrochloride is obtained in this way.

In order to prepare the aminodiphenyl from the hydrochloride, it is merely necessary to dissolve or suspend in water, add the theoretical quantity of an alkali such as caustic soda or sodium carbonate to neutralize the hydrochloric acid, and filter off the free amine. Since the free amine is slightly soluble in cold water, the filtrate and washings may be worked up by concentration and cooling in the usual way.

In the same manner, the reduction of the 4-nitrodiphenyl may be carried out. However, because of the greater insolubility of this substance, it should be dissolved in 250 cc. of benzene before treating with iron, instead of 125 cc., as in the case of the 2-nitrodiphenyl.

Instead of activating the iron filings before treating with the benzene solution of a nitrodiphenyl, it is possible to vary the procedure so that the iron filings are first mixed with the nitrodiphenyl, then moistened with a little water, and finally acidified with hydrochloric acid. On heating the mixture, reduction commences, the reaction being maintained until completion by heating on the water bath. After reduction is complete, the reaction mass is leached with benzene, then water is added to the benzene solution and the two liquids shaken together. After separating the two liquids, hydrochloric acid is added to the aqueous solution and the hydrochloride precipitated. The free amine may be liberated from the hydrochloride by treatment with alkali as above described.

It is obvious that considerable variation may be made in the procedure and practice of my invention without departing from the spirit thereof. While I prefer to use hydrochloric acid because of its low price, I may carry out the reduction in the presence of other acids, such as sulphuric, acetic, etc. In place of benzene, other aromatic or aliphatic solvents or mixtures may be used without affecting the result.

Further, it should be understood that while I have specifically described the reduction of the 2- and the 4-nitrodiphenyls, any of the various nitrodiphenyls may be reduced to give the corresponding amine. For example, 2,2' dinitrodiphenyl will give the 2,2' diaminodiphenyl, the 4,4' dinitrodiphenyl will give the 4,4' diaminodiphenyl (benzidine), etc.

What I claim is:

1. The process of producing the aminodiphenyls uncontaminated with chlorine substitution products of aminodiphenyl from the corresponding nitrodiphenyl, comprising mixing a non-aqueous benzene solution of the said nitrodiphenyl with the dried product produced by reacting powdered iron with concentrated hydrochloric acid in such proportion as to leave a substantial proportion of the iron unreacted, then adding water to said mixture.

2. The process of producing the aminodiphenyls uncontaminated with chlorine substitution products of aminodiphenyl by the reduction of the corresponding nitrodiphenyl, comprising mixing a non-aqueous solution of the said nitrodiphenyl with the dried product resulting from air-drying a mixture of less than the equivalent quantity of concentrated hydrochloric acid necessary for the formation of ferrous chloride with powdered iron, and controlling said reduction by means of water added to the reacting mass.

3. The process of producing the aminodiphenyls uncontaminated with chlorine substitution products of aminodiphenyl by the reduction of the corresponding nitrodiphenyls, comprising mixing a benzene solution of the said nitrodiphenyl with the air-dried product obtained by reacting powdered iron and concentrated hydrochloric acid in substantially the proportions of 500 grams of the iron to 87.5 c. c. of the acid, and controlling said reduction by means of water added to the reacting mass.

4. In the process of reducing nitrodiphenyl, dissolved in benzene, to the corresponding aminodiphenyl, the step of using a substantially dry reducing agent produced by the action of hydrochloric acid on finely divided iron, followed by drying the proportion of hydrochloric acid employed being such that the major portion of the iron is unreacted.

5. In the process of reducing nitrodiphenyls to the corresponding aminodiphenyls, the steps which comprise subjecting finely divided iron to the action of hydrochloric acid, in such proportion that a minor portion only of the iron is acted upon drying the resulting product, and reducing the dissolved nitrodiphenyl with that resulting product.

6. The process of producing aminodiphenyl uncontaminated with chlorine substitution products of aminodiphenyl, comprising dissolving the corresponding nitrodiphenyl in an organic solvent and reducing said nitrodiphenyl with the dried product produced by reacting powdered iron with concentrated hydrochloric acid in such proportions as to leave a substantial proportion of the iron unreacted.

7. The process of producing aminodiphenyls, comprising dissolving the corresponding nitrodiphenyl in an organic solvent and reducing said nitrodiphenyl by means of the dry product resulting from air-drying a previously prepared mixture of powdered iron and concentrated hydrochloric acid, said acid being employed in a proportion insufficient to convert all of the iron to a salt.

8. The process of producing aminodiphenyls, comprising dissolving the corresponding nitrodiphenyl in an aromatic solvent and reducing said nitrodiphenyl by means of the dry product resulting from air-drying a previously prepared mixture of powdered iron and concentrated hydrochloric acid, said iron and hydrochloric acid being mixed in the proportions of substantially 500 grams of iron and 87.5 c. c. of hydrochloric acid.

9. The process of producing aminodiphenyls uncontaminated with chlorine substitution products of aminodiphenyl, comprising dissolving the corresponding nitrodiphenyl in an organic solvent and reducing said nitrodiphenyl by means of the dry product resulting from air-drying a previously prepared mixture of powdered iron and an acid selected from the group consisting of, hydrochloric, sulphuric, acetic, said acid being employed in a proportion insufficient to convert all of the iron to a salt.

CHARLES F. BOOTH.